/ Patented Mar. 13, 1951

2,544,737

UNITED STATES PATENT OFFICE 2,544,737

11-OXABICYCLO[4.4.1]UNDECANES AND THEIR PREPARATION

Clement W. Theobald, Wilmington, Del., assignor to E. I. du Pont de Nemours & Company, Wilmington, Del., a corporation of Delaware No Drawing. Application January 7, 1949, Serial No. 69,843

10 Claims. (Cl. 260—333)

This invention relates to new bicyclic ethers and to methods for their preparation.

It is known that when oxygenated organic compounds undergo hydrogenolysis the oxygen disappears from the molecule. Thus, Adkins on page 69 in his textbook "Reactions of Hydrogen," The University of Wisconsin Press, Madison, Wisconsin (1937), points out that benzyl alcohol is converted almost quantitatively to toluene when it is heated over nickel at 100° to 125° C., and that ethyl benzoate yields toluene by heating it at 250° C. over a copper-chromium oxide catalyst (page 101). Hitherto there has been no known instance of a hydrogenolysis occurring with simultaneous formation of ether groups.

It is an object of this invention to provide new bicyclic ethers and methods for their preparation. Another object is to provide new bicyclic ether compounds by the catalytic hydrogenolysis of 6-oxycyclodecanones-1. Other objects will appear hereinafter.

These objects are accomplished by the new bicyclic ethers of this invention which comprise 11-oxabicyclo[4.4.1]-undecanes containing at least one hydrogen atom attached to each annular carbon atom and not more than one alkyl radical which is attached to an annular carbon atom with all the remaining valences of the annular carbon atoms being saturated by hydrogen atoms. Thus the new bicyclic ethers of this invention correspond in structure to the following formula:

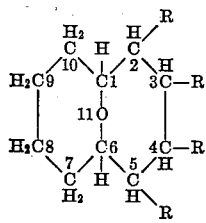

where R is selected from the group consisting of hydrogen and alkyl radicals, not more than one R is an alkyl radical and all the remaining R's are hydrogen. R is preferably hydrogen or an alkyl radical of from 1 to 3 carbon atoms, that is methyl, ethyl or propyl.

It has now been discovered that 6-oxycyclodecanones-1, in which the oxy-substituent is hydroxy or alkoxy, can be successfully subjected to hydrogenolysis to produce good yields of new bicyclic ethers. The 6-oxycyclodecanones-1 contain not more than one alkyl radical attached to an annular carbon atom with all remaining valences of the annular carbon atoms being satisfied by hydrogen atoms. These 6-oxycyclodecanones-1 correspond in structure to the following formula:

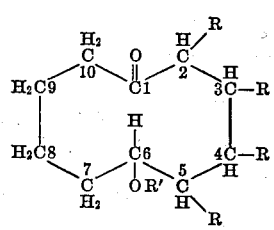

where OR' is hydroxy or alkoxy, R is hydrogen or alkyl, and not more than one R is an alkyl group, with the remaining R's being hydrogen.

The new bicyclic ethers of this invention are obtained by passing a vapor mixture of the 6-hydroxy- or 6-alkoxycyclodecanone and hydrogen over a noble metal catalyst, e. g., platinum, heated to a temperature of 140 to 350° C. The vapor mixture is preferably passed over the noble metal catalyst continuously at essentially atmospheric pressure. From the reaction mixture the desired bicyclic ether is recovered.

A suitable apparatus for effecting the hydrogenolysis of this invention consists of a U-shaped reactor suspended in a bath of boiling liquid and equipped with a feed burette, a hydrogen inlet, and a condensing system to remove high-boiling products from the vapor stream.

In operation, the material to be subjected to hydrogenolysis and hydrogen are fed to one arm of the U-tube which is packed with glass helices and serves as a preheater section. The heated gas mixture is then passed over the catalyst bed in the other arm of the U-tube and then to the condensing system.

A suitable platinum catalyst is prepared by pouring a solution of 10.60 grams of chloroplatinic acid in 400 cc. of distilled water over 400 cc. (195 grams) of nitric acid-extracted, washed, and dried charcoal of 4–14 mesh. This suspension is stirred and the water evaporated by heating on a steam bath with intermittent manual stirring. Before the start of operation 50 cc. of this catalyst is placed in the reactor and heated to between 140° and 350° C. under a hydrogen flow of 200 l./hr. After 1 hour and 20 minutes at the selected temperature the 6-hydroxy- or 6-alkoxycyclodecanone is added from a steam-jacketed, constant head addition burette.

The examples which follow are submitted to illustrate and not to limit this invention.

Example I

Into the reactor previously described, heated to 155° C. and packed with 50 cc. of the platinum-on-charcoal catalyst, prepared as described, there was added 6-hydroxycyclodecanone-1 at a rate between 4 and 4.5 grams/hr. for a period of 9 hours, maintaining the hydrogen flow at the rate of 200 l./hr. meanwhile. A total of approximately 40 grams of 6-hydroxycyclodecanone-1 was added during this time. The hydrogen flow was maintained for a period of 1.5 hours after addition of the last of the 6-hydroxycyclodecanone-1. The product collected consisted of a lower aqueous layer weighing 5.10 grams and an upper organic layer weighing 21.50 grams. The layers were separated, the aqueous layer extracted with carbon tetrachloride and the combined organic layers dried over anyhdrous sodium sulfate. After removal of the organic solvent, the residue was distilled. After a small foreshot, a fraction boiling at 70° C./8 mm., $n_D^{25}$ 1.4709, weighing 3.52 grams was collected. A second fraction boiling at 86° C./8 mm., freezing point 22.8° C., $n_D^{25}$ 1.4838 and weighing 9.4 grams was obtained. The analysis and physical properties of the first fraction indicated it to be a hydrocarbon.

Anal. calc'd for $C_{10}H_{20}$: C, 85.62; H, 14.37.
Found: C, 85.49, 85.32; H, 14.39, 14.25.

The material was insoluble and unaffected by concentrated, cold, sulfuric acid and gave an infrared spectrum similar to the spectrum of an authentic sample of cyclodecane.

The higher boiling fraction was soluble in cold concentrated sulfuric acid with the development of a yellow color, gave no reactions for OH or C=O functional groups and analyzed correctly for the composition $C_{10}H_{18}O$ as follows:

Anal. calc'd for $C_{10}H_{18}O$: C, 77.87; H, 11.76.
Found: C, 77.61, 77.74; H, 12.06, 11.98.

The infrared spectrum of this material indicated the complete absence of carbonyl or hydroxyl groups and an absorption band in the proper region for an ether group. From its composition, inertness and infrared spectrum, the structure, 11-oxabicyclo[4.4.1]undecane has been assigned to this compound. The yields of the cyclodecane and the 11-oxabicyclo[4.4.1]undecane, calculated on the 6-hydroxycyclodecanone-1 reacted were 23% and 40%, respectively.

Example II

Operating with the same apparatus and by a similar procedure to the above example, 35.0 grams of 6-methoxycyclodecanone-1 was added at an average rate of 5.25 grams/hr. The liquid product again consisted of two layers whose combined weight was 29.83 grams. Upon fractionation, a 10% yield of the hydrocarbon and a 45% yield of the cyclic ether was obtained. The higher boiling material from this run was identical with the corresponding fraction in the above example as shown by the fact that a mixture of the two compounds did not exhibit a depression of the freezing point.

Although the examples have illustrated certain specific conditions of catalyst concentration, space velocity, temperature, duration of reaction, etc., it is to be understood that these may be varied somewhat since the conditions of each experiment are determined by the particular compound being reacted, the temperature employed, and other reaction conditions.

In general, the hydrogenolysis is effected at pressures which are essentially atmospheric and temperatures which range from 140° to 350° C. Since satisfactory reaction rates are obtained at temperatures of from 150° C. to 300° C. this range constitutes the one most useful in actual practice. If desired pressures which are slightly above or below atmospheric may be used.

The amount of hydrogen used is at least one mole per mole of 6-hydroxy- or 6-alkoxycyclodecanone employed. In actual practice, larger amounts of hydrogen are used to aid in the vaporization of the 6-hydroxy- or 6-alkoxycyclodecanone, to insure complete reaction, and to aid in the removal of the exothermic heat of reaction. If desired this hydrogen may be diluted with an inert gas such as nitrogen or carbon dioxide to aid in the dissipation of the heat of reaction.

In practice it is necessary to employ very efficient condensing means to recover the hydrogenolysis product carried over by the excess hydrogen, and also to recirculate the hydrogen through the reactor, in order to insure complete recovery of these ethers. In the laboratory it is difficult to attain these conditions, and for this reason the yields given in the examples are lower than the actual yields under the conditions employed.

Any suitable platinum catalyst may be used. Thus, there may be employed metallic platinum or any of its compounds such as the oxide, chloride, hydrochloride, etc., either unsupported or supported on such materials as charcoal, alumina, pumice, kieselguhr, etc. During operation the platinum compounds are probably reduced to metallic platinum.

Platinum is the preferred catalyst and especially platinum made by the hydrogen reduction of chloroplatinic acid on charcoal as previously described. Such catalysts appear to have a residual acidity which in some way appears to have an activating effect on the catalyst.

A suitable amount of catalyst is such as to furnish at least 0.001 gram of platinum per gram of compound being processed per hour. Ordinarily, larger amounts of the order of 0.10 gram of platinum per gram of compound being processed per hour, is employed because the advantages accruing from the standpoint of speed of reaction offset the added catalyst cost.

In place of platinum other noble metal catalysts such as palladium, rhodium and the like may be used.

If desired, the process may be carried out in the presence of an inert solvent such as an aliphatic hydrocarbon, acetic acid and other lower aliphatic carboxylic acids, etc. Ordinarily no solvent is employed because the use of such solvent adds to the cost without compensating practical advantages.

The compounds processed according to this invention, to yield the new bicyclic ethers of this invention, are the 6-hydroxy- and the 6-alkoxy-cyclodecanones-1. Examples of 6-alkoxycyclodecanones-1 are 6-methoxycyclodecanone-1, 6-ethoxycyclodecanone-1, 6-isopropyloxycyclodecanone-1, 6-butyroxycyclodecanone-1, 6-octyloxycyclodecanone-1, 6-dodecyloxycyclodecanone-1, 6-octadecyloxycyclodecanone-1, 3-methyl-6-methoxycyclodecanone-1, and the like. The short chain alkoxycyclodecanones having alkoxy substituents containing less than 7 carbon atoms, such as 6-methoxy, 6-ethoxy, and 6-butyroxy-cyclodecanones-1 offer advantages of economy, ease of preparation, and stability and are therefore the preferred 6-alkoxycyclodecanones-1. However, as the hydroxy or alkoxy substituent is removed on hydrogenolysis any 6-alkoxycyclodecanone-1 can be employed including those having alkoxy substituents containing up to 18 or more carbon atoms. Alkyl-6-alkoxycyclodecanones-1 in which the alkyl radical contains from 1 to 3 carbon atoms are preferable to produce alkyl-11-oxabicyclo[4.4.1]undecanes. However, 6-alkoxycyclodecanones-1 having an alkyl substituent containing up to 18 or more carbon atoms can be used.

The bicyclic ethers of this invention are useful as intermediates for other syntheses, for example, for conversion to glycols, as solvents, plasticizers, and the like.

As many apparently widely different embodiments of this invention may be made without departing from the spirit and scope thereof, it is to be understood that this invention is not limited to the specific embodiments thereof except as defined in the appended claims.

I claim:

1. A method of preparing an 11-oxabicyclo-[4.4.1]undecane which comprises passing a vapor mixture of hydrogen and a 6-oxycyclodecanone-1 in which the oxy-substituent is selected from the group consisting of hydroxy and alkoxy radicals over a noble metal catalyst heated to a temperature of 140° to 350° C., said 6-oxycyclodecanone-1 containing not more than one alkyl radical of 1 to 3 carbon atoms attached to an annular carbon atom, all remaining valences of said annular carbon atoms being satisfied by hydrogen atoms, and said vapor mixture containing at least one mole of hydrogen per mole of 6-oxycyclodecanone-1.

2. A method of preparing an 11-oxabicyclo-[4.4.1]undecane which comprises passing a vapor mixture of hydrogen and a 6-oxycyclodecanone-1 in which the oxy-substituent is selected from the group consisting of hydroxy and alkoxy radicals over a platinum catalyst heated to a temperature of 140° to 350° C., said 6-oxycyclodecanone-1 containing not more than one alkyl radical of 1 to 3 carbon atoms attached to an annular carbon atom, all remaining valences of said annular carbon atoms being satisfied by hydrogen atoms, and said vapor mixture containing at least one mole of hydrogen per mole of 6-oxycyclodecanone-1.

3. A method of preparing an 11-oxabicyclo-[4.4.1]undecane which comprises passing a vapor mixture of hydrogen and a 6-hydroxycyclodecanone-1 over a platinum catalyst heated to a temperature of 140° to 350° C., said 6-hydroxycyclodecanone-1 containing not more than one alkyl radical of 1 to 3 carbon atoms attached to an annular carbon atom, all remaining valences of said annular carbon atoms being satisfied by hydrogen atoms, and said vapor mixture containing at least one mole of hydrogen per mole of 6-hydroxycyclodecanone-1.

4. A method of preparing an 11-oxabicyclo-[4.4.1]undecane which comprises passing a vapor mixture of hydrogen and a 6-alkoxycyclodecanone-1 over a platinum catalyst heated to a temperature of 140° to 350° C., said 6-alkoxycyclodecanone-1 containing not more than one alkyl radical of 1 to 3 carbon atoms attached to an annular carbon atom, all remaining valences of said annular carbon atoms being satisfied by hydrogen atoms, and said vapor mixture containing at least one mole of hydrogen per mole of 6-alkoxycyclodecanone-1.

5. A method of preparing 11-oxabicyclo-[4.4.1]undecane which comprises passing a vapor mixture of hydrogen and 6-hydroxycyclodecanone-1 over a platinum catalyst heated to a temperature of 140° to 350° C., said vapor mixture containing at least one mole of hydrogen per mole of 6-hydroxycyclodecanone-1.

6. A method of preparing 11-oxabicyclo-[4.4.1]undecane which comprises passing a vapor mixture of hydrogen and a 6-alkoxycyclodecanone-1 over a platinum catalyst heated to a temperature of 140° to 350° C., all remaining valences of the annular carbon atoms being satisfied by hydrogen atoms and said vapor mixture containing at least one mole of hydrogen per mole of 6-alkoxycyclyodecanone-1.

7. A method of preparing 11-oxabicyclo-[4.4.1]undecane which comprises passing a vapor mixture of hydrogen and 6-methoxycyclodecanone-1 over a platinum catalyst heated to a temperature of 140° to 350° C., said vapor mixture containing at least one mole of hydrogen per mole of 6-methoxycyclodecanone-1.

8. An 11-oxabicyclo[4.4.1]undecane containing at least one hydrogen atom attached to each annular carbon atom and not more than one alkyl radical of 1 to 3 carbon atoms attached to an annular carbon atom, all remaining valences of said annular carbon atoms being satisfied by hydrogen atoms.

9. An 11-oxabicyclo[4.4.1]undecane containing at least one hydrogen atom attached to each annular carbon atom and one alkyl radical of 1 to 3 carbon atoms attached to an annular carbon atom, all remaining valences of said annular carbon atoms being satisfied by hydrogen atoms.

10. The chemical compound 11-oxabicyclo-[4.4.1]undecane.

CLEMENT W. THEOBALD.

No references cited.